US010169088B2

(12) United States Patent
Tsirkin

(10) Patent No.: US 10,169,088 B2
(45) Date of Patent: Jan. 1, 2019

(54) LOCKLESS FREE MEMORY BALLOONING FOR VIRTUAL MACHINES

(71) Applicant: Red Hat Israel, Ltd., Ra'anana (IL)

(72) Inventor: Michael Tsirkin, Westford, MA (US)

(73) Assignee: Red Hat Israel, Ltd., Ra'anana (IL)

( * ) Notice: Subject to any disclaimer, the term of this patent is extended or adjusted under 35 U.S.C. 154(b) by 30 days.

(21) Appl. No.: 15/363,752

(22) Filed: Nov. 29, 2016

(65) Prior Publication Data

US 2018/0150327 A1 May 31, 2018

(51) Int. Cl.
*G06F 12/02* (2006.01)
*G06F 9/50* (2006.01)
*G06F 12/1027* (2016.01)
*G06F 9/455* (2018.01)

(52) U.S. Cl.
CPC ........ *G06F 9/5016* (2013.01); *G06F 9/45558* (2013.01); *G06F 12/0253* (2013.01); *G06F 12/1027* (2013.01); *G06F 2009/45583* (2013.01); *G06F 2212/657* (2013.01)

(58) Field of Classification Search
None
See application file for complete search history.

(56) References Cited

U.S. PATENT DOCUMENTS

| 8,667,207 B2 | 3/2014 | Knowles et al. |
| 8,943,259 B2 | 1/2015 | Weissman et al. |
| 9,069,669 B2 | 6/2015 | Li et al. |
| 9,323,552 B1 | 4/2016 | Adogla et al. |
| 2009/0307686 A1* | 12/2009 | Hepkin ............... G06F 9/45558 718/1 |
| 2012/0216007 A1 | 8/2012 | Tsirkin |
| 2012/0317331 A1 | 12/2012 | Broas |
| 2013/0290596 A1* | 10/2013 | Corrie .................. G06F 12/023 711/6 |

(Continued)

FOREIGN PATENT DOCUMENTS

WO    WO 2015/132753 A1    9/2015

OTHER PUBLICATIONS

Balloon Driver Retains Hold on Memory Causing Virtual Machine Guest Operating System Performance Issues (1003470), https://kb.vmware.com/selfservice/microsites/search.do?language=en_US&cmd=displayKC&externalId=1003470.

(Continued)

*Primary Examiner* — Brian R Peugh
(74) *Attorney, Agent, or Firm* — Haynes and Boone, LLP

(57) ABSTRACT

An example method for managing memory includes receiving an inflate notification including a first identifier corresponding to a first time. The inflate notification indicates that a set of guest memory pages is unused by the guest at the first time. The method also includes determining whether the first identifier precedes a last identifier corresponding to a second time and included in a previously sent inflate request to the guest. If the first identifier does not precede the last identifier, the method also includes (i) for a first subset of the set modified since the first time, determining to not reclaim a first set of host memory pages corresponding to the first subset of guest memory pages, and (ii) for a second subset not modified since the first time, reclaiming a second set of host memory pages corresponding to the second subset of guest memory pages.

19 Claims, 6 Drawing Sheets

(56) References Cited

U.S. PATENT DOCUMENTS

2015/0199209 A1 7/2015 Tsirkin
2016/0170653 A1 6/2016 Bonzini et al.

OTHER PUBLICATIONS

Linux/Include/Linux/Balloon_Compaction.h, http://lxr.free-electrons.com/source/include/linux/balloon_compaction.h.

Tudor-loan Salomie, Gustavo Alonso, Timothy Roscoe, Kevin Elphinstone, *Application Level Ballooning for Efficient Server Consolidation*, Apr. 15-17, 2013, Systems Group, Computer Science Department ETH Zurich, Switzerland; UNSW and NICTA, Australia, https://people.inf.ethz.ch/troscoe/pubs/eurosys13-alb.pdf.

\* cited by examiner

LOCKLESS FREE MEMORY BALLOONING FOR VIRTUAL MACHINES

FIELD OF DISCLOSURE

The present disclosure generally relates to electrical computers and digital data processing, and more particularly relates to memory management.

BACKGROUND

A virtual machine is software that is executed on hardware to create a virtualization of a physical computer system. Virtual machines may function as self-contained platforms that run their own operating systems and software applications. A host machine may concurrently run one or more virtual machines using software that is referred to as a hypervisor. The hypervisor allocates a certain amount of the host machine's resources, such as the host machine's underlying physical processors and memory devices, to each of the virtual machines. This allocating by the hypervisor allows guests of the virtual machines to transparently access the host machine's resources.

Guest applications, including guest operating systems, may be executed on the allocated resources of each virtual machine. Local or remote clients may access these guest applications to perform computing tasks. In some instances, virtual machines and guest applications may be implemented to provide cloud computing environments.

SUMMARY

A system of one or more computers can be configured to perform particular operations or actions by virtue of having software, firmware, hardware, or a combination thereof installed on the system that causes the system to perform the actions.

In some examples, an example method of managing memory includes receiving, by a hypervisor, an inflate notification from a guest running on a virtual machine. The virtual machine and the hypervisor run on a host machine. The inflate notification includes a first identifier corresponding to a first time. The inflate notification indicates that a set of guest memory pages is unused by the guest at the first time. The method also includes determining whether the first identifier precedes a last identifier corresponding to a second time and included in a previously sent inflate request to the guest. If the first identifier does not precede the last identifier, the method further includes for a first subset of the set of guest memory pages modified since the first time, determining, by the hypervisor, to not reclaim a first set of host memory pages corresponding to the first subset of guest memory pages. If the first identifier does not precede the last identifier, the method further includes for a second subset of the set of guest memory pages not modified since the first time, reclaiming, by the hypervisor, a second set of host memory pages corresponding to the second subset of guest memory pages.

In some examples, an example system for managing memory includes a hypervisor memory that stores one or more identifiers and one or more data structures. Each data structure corresponds to an identifier that corresponds to a time. The system also includes a memory manager that sends an inflate request including a first identifier corresponding to a first time to a guest running on a virtual machine and receives an inflate notification including a second identifier corresponding to a second time. The inflate notification indicates that a set of guest memory pages is unused by the guest at the second time. If the first identifier matches the second identifier, the memory manager determines to not reclaim a first set of host memory pages corresponding to a first subset of guest memory pages modified since the first time and reclaims a second set of host memory pages corresponding to a second subset of guest memory pages not modified since the first time.

In some examples, an example machine-readable medium includes a plurality of machine-readable instructions that when executed by one or more processors is adapted to cause the one or more processors to perform a method including: receiving, by a hypervisor, an inflate notification from a guest running on a virtual machine, the virtual machine and the hypervisor running on a host machine, the inflate notification including a first identifier corresponding to a first time, and the inflate notification indicating that a set of guest memory pages is unused by the guest at the first time; determining that the first identifier matches a second identifier corresponding to a second time and included in a most recently sent inflate request to the guest; and for a first subset of the set of guest memory pages modified since the first time, determining, by the hypervisor, to not reclaim a first set of host memory pages corresponding to the first subset of guest memory pages; and for a second subset of the set of guest memory pages not modified since the first time, reclaiming, by the hypervisor, a second set of host memory pages corresponding to the second subset of guest memory pages.

Figure 1:
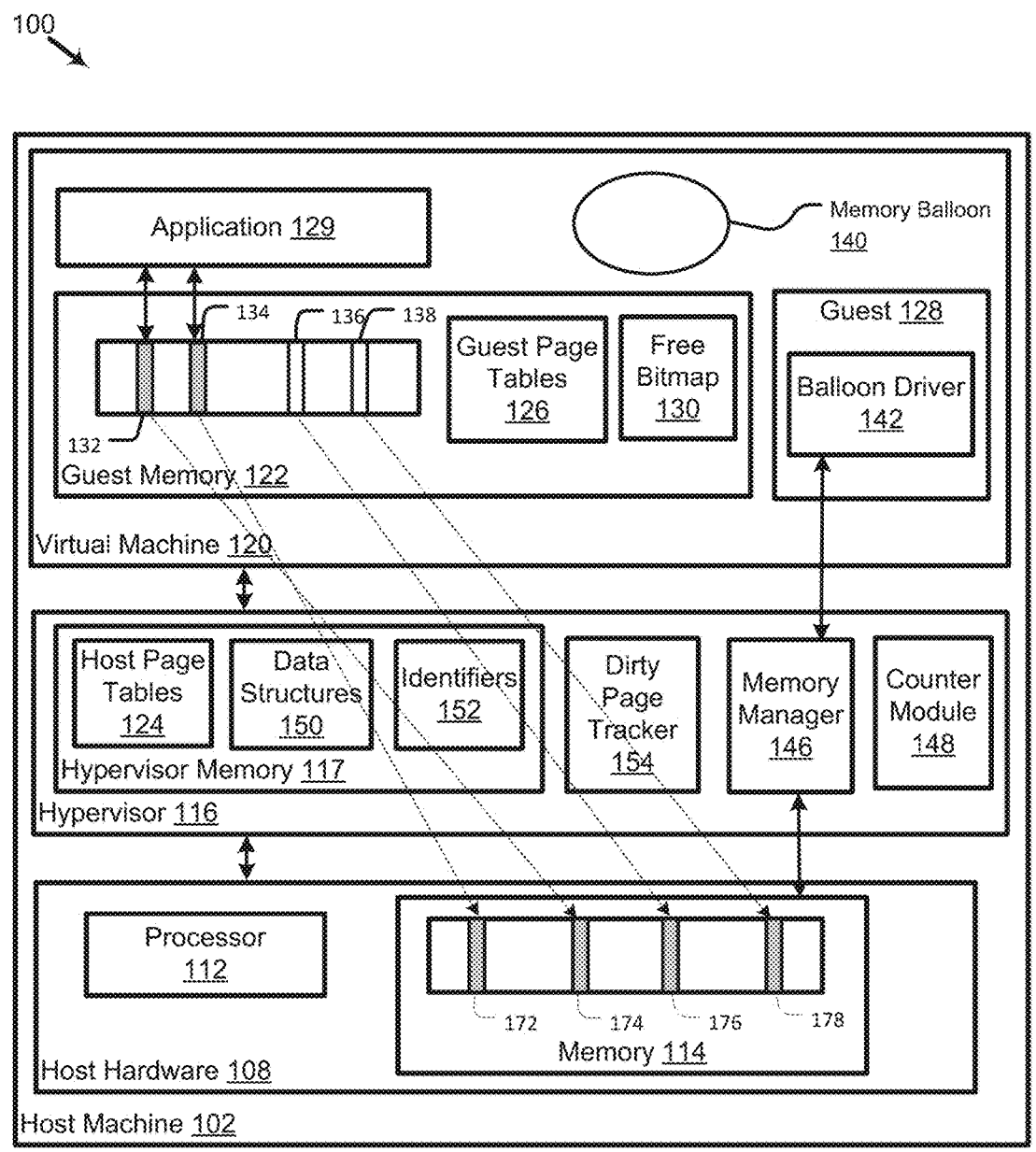
FIG. 1 is an example block diagram illustrating a system for managing memory in accordance with various examples of the present disclosure.

Examples of the present disclosure and their advantages are best understood by referring to the detailed description that follows.

I. Overview

II. Example System Architecture

A. Memory Address Mappings

B. Free Guest Memory Pages

C. Memory Ballooning

III. Hypervisor Sends an Inflate Request Including an Identifier to Guest

A. Dirty Memory Tracking

B. Inflate Request Includes an Identifier Corresponding to a Time

IV. Reclaim the Appropriate Ballooned Guest Memory Pages
   A. Place a Set of Free Guest Memory Pages in a Memory Balloon
   B. Inflate Notification Includes an Identifier and Specifies a Set of Guest Memory Pages
      1. Match the Inflate Notification to an Inflate Request
      2. Do Not Reclaim Host Memory Pages Corresponding to Dirty Guest Memory Pages
V. Example Methods

DETAILED DESCRIPTION

In the following description, specific details are set forth describing some examples consistent with the present disclosure. It will be apparent, however, to one skilled in the art that some examples may be practiced without some or all of these specific details. The specific examples disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one example may be incorporated into other examples unless specifically described otherwise or if the one or more features would make an example non-functional.

I. OVERVIEW

As computing systems become ever more distributed over the Internet and the "cloud," the boundary between one computer or machine in the computing system and another computer or machine becomes less distinct. In some instances, a single physical computer may play host to more than one computer or machine using virtualization. This provides great flexibility in the computing system as it is not always necessary to arrange systems in terms of a single application being hosted by a single physical server. In virtualization, a system may host multiple virtual machines on the same server. Each of the virtual machines may appear to the rest of the computing system as a separate computer or machine, but may actually be one of many virtual machines being emulated by the same server. This may allow the same server to provide virtual machines running different operating systems (OS) and applications as well as to provide different services to different users. As typically configured, each of the physical servers in a virtual environment runs a host OS that manages the server's hardware and coordinates the use of various computing resources on the server, such as memory, for each of the virtual machines, which is running a virtual or guest OS. A guest OS may be referred to as a guest. As each of the virtual machines become more complex, management of the computing resources may become more complex as well. Accordingly, it may be desirable to provide improved techniques for managing memory in a virtual environment.

Due to the virtual machine's isolation, the guest is unaware that it is running inside a virtual machine and is not aware of the states of other virtual machines on the same host. When the hypervisor runs multiple virtual machines and the total amount of the free host memory becomes low, none of the virtual machines may free guest memory because the guest is unable to detect the host machine's memory shortage.

Memory ballooning may reduce host memory usage by the guest. Memory ballooning is a useful technique for improving guest memory management for virtual machines. With memory ballooning, a balloon driver may be loaded into the guest and place guest memory pages into a memory balloon. In some examples, the guest pins these memory pages down to ensure that they cannot be paged out to disk under any circumstances. The guest sends the hypervisor an inflate notification indicating that a set of memory pages are unused by the guest at a particular time. The inflate notification may indicate to the hypervisor that the guest has placed the set of guest memory pages in the memory balloon. The hypervisor is then free to discard the content of this memory, freeing up host resources. In an example, the balloon driver notifies the hypervisor regarding the page numbers of the pinned guest memory so that the hypervisor can reclaim the host memory pages that are backing them. The hypervisor can safely reclaim this host physical memory because neither the balloon driver nor the guest relies on the content of these pages. This means that no processes in the virtual machine will intentionally access those pages to read/write any values. Thus, it may be unnecessary for the hypervisor to allocate host physical memory to store the page content. When the hypervisor decides to deflate the balloon by setting a smaller target balloon size, the balloon driver de-allocates the pinned guest memory, which releases it for usage by the guest and its applications. Additionally, a guest may deflate the balloon by accessing one or more memory pages placed in the balloon.

In response to the inflate notification indicating that a set of guest memory pages has been placed in the memory balloon, the hypervisor is free to discard the content of this memory and reclaim it. A problem occurs if the guest reuses the set of guest memory pages before the hypervisor receives the inflate notification because the hypervisor may discard valid memory content upon its receipt. To overcome this problem, the guest may hold a lock that prevents new memory pages from being used. A lock on a memory page may prevent it from being used until the guest receives approval from the hypervisor to use the memory page. In doing so, the guest synchronizes with the hypervisor to gain reuse of the page. Unfortunately, expensive host-guest synchronization is implemented before a memory page is reused, and has been shown to take seconds for large memory regions, representing a significant scalability issue for memory ballooning.

To improve the scalability, the guest may asynchronously pass free guest memory pages to the hypervisor, reusing them without waiting for hypervisor acknowledgement or approval, while still allowing the hypervisor to discard memory page content. The inflate notification from the guest to the hypervisor is asynchronous in the sense that the guest does not wait for the hypervisor's approval before removing memory pages from the memory balloon and using them again.

To prevent the hypervisor from discarding valid memory content, the present disclosure may provide techniques for the hypervisor to determine whether or not to reclaim a memory page indicated as being in the guest's memory balloon. In an example, the disclosure provides techniques for the hypervisor to figure out whether an inflate notification has been delayed and so is not safe to act upon any longer. If the hypervisor determines that the inflate notification is not safe to act upon any longer, the hypervisor may determine to discard the inflate notification and not reclaim host memory pages based on the inflate notification. If the hypervisor determines that the inflate notification is safe to act upon, the hypervisor may determine to reclaim host memory pages based on the inflate notification.

These techniques are beneficial and advantageous for reducing the time it takes for a guest to reclaim a memory page that the guest placed in a memory balloon and now wants to reuse. Additionally, it may be unnecessary for the guest to wait for the hypervisor's approval before removing a memory page from the memory balloon and reusing it. Of course, it is understood that these features and advantages are shared among the various examples herein and that no one feature or advantage is required for any particular example.

II. EXAMPLE SYSTEM ARCHITECTURE

FIG. 1 is an example block diagram illustrating a system 100 for managing memory in accordance with various examples of the present disclosure.

The system 100 includes a host machine 102 that may run one or more virtual machines (VMs), which may run one or more applications and/or services. The host machine 102 may include a personal computer (PC), tablet PC, rack mount computer, cellular telephone, web appliance, server, network router, switch or bridge, or any machine capable of executing a set of instructions (sequential or otherwise) that specify actions to be taken by that machine. Further, while a single host machine is illustrated, the term "machine" shall also be taken to include any collection of machines that individually or jointly execute a set (or multiple sets) of instructions to perform any one or more of the methodologies discussed herein. For example, a collection of machines may be communicatively coupled via one or more network devices and/or transport media.

The host machine 102 may be communicatively coupled to a network (not shown) that communicates data between the host machine 102 and another machine. For example, the network may transmit data corresponding to one or more virtual machines from the host machine 102 to the other machine. The network may include one or more public and/or private networks, which may each include network devices that transfer data via wired and/or wireless transmission media.

The host machine 102 is structured with host hardware 108. The host hardware 108 includes physical elements such as a processor 112 and a memory 114. In some examples more than one of each of these hardware elements may be included. For example, the host hardware 108 may include a plurality of processors coupled to various types of memory and host devices.

The processor 112 included in the host hardware 108 is structured to include one or more general-purpose processing devices such as a microprocessor, central processing unit, and the like. More particularly, the processor 112 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some examples, the processor 112 is structured to include one or more special-purpose processing devices such as an application specific integrated circuit (ASIC), a field programmable gate array (FPGA), a digital signal processor (DSP), network processor, and so forth. The processor 112 executes instructions for performing the operations, steps, and/or actions discussed herein.

The memory 114 included in the host hardware 108 is structured to include at least one computer-readable storage medium on which is stored one or more sets of instructions (e.g., software) embodying any one or more of the methodologies or functions described herein. The memory 114 may be structured to include one or more of a read-only memory (ROM), flash memory, dynamic random access memory (DRAM) such as synchronous DRAM (SDRAM), double data rate (DDR SDRAM), or DRAM (RDRAM), and so forth), static memory (e.g., flash memory, static random access memory (SRAM), and so forth), and a data storage device (e.g., a hard disk drive (HDD), solid state drive (SSD), and so forth). Accordingly, any of the operations, steps, and/or actions of the methods described herein may be implemented using corresponding machine-readable instructions stored on or in a non-transitory machine-readable medium that are executable by the processor 112.

The processor 112 and the memory 114 may be communicatively coupled via one or more buses (e.g., a PCI bus) and/or integrated into a motherboard of the host machine 102. The host hardware 108 may include other hardware elements, such as a video display unit (e.g., a liquid crystal display (LCD) monitor), alphanumeric input device (e.g., a keyboard), cursor control device (e.g., a mouse), signal generation device (e.g., a speaker), a network interface card, wireless adapter card, audio/sound card, graphics card, storage adapter, and/or other hardware device.

The host machine 102 is structured to include a hypervisor 116, which may include a virtual machine monitor and/or virtual machine manager. The hypervisor 116 is structured with executable instructions that are stored in the memory 114 and executed by the processor 112 to provide one or more virtual machines. In some examples, the hypervisor 116 is structured to run on top of a host OS and/or kernel. In other examples, the hypervisor 116 is run directly on host hardware 108 without the use of a separate OS or kernel.

The system 100 includes a virtual machine 120 that is provided by the hypervisor 116. The hypervisor 116 is structured to provide the virtual machine 120 by virtualizing at least a portion of the host hardware 108. The hypervisor 116 may provide the virtual machine 120 by performing a hardware emulation, full virtualization, para-virtualization, and/or OS-level virtualization corresponding to the host machine 102. The hypervisor 116 manages system resources, including providing access of guests (e.g., guest applications such as OS s, kernels, user applications, and so forth) of the virtual machine 120 to the host hardware 108, such as the processor 112 and the memory 114.

Although one virtual machine is illustrated as running on hypervisor 116, the hypervisor 116 may provide a plurality of virtual machines. Other virtual machines may include components similar to those illustrated with respect to virtual machine 120, such as a guest, guest memory, guest page tables, balloon driver, and so forth.

A. Memory Address Mappings

The virtual machine 120 is structured with a guest memory 122. The guest memory 122 is a memory resource that is provided by the hypervisor 116. The hypervisor 116 is structured to provide the guest memory 122 by allocating a portion of the memory 114 using the host page tables 124, which is stored in a hypervisor memory 117. The memory 114 may also be referred to as the host memory 114. Additionally, a host memory page may also be referred to as a physical memory page. The memory 114 is divided into host-physical memory addresses that are portioned into fixed-length blocks of memory that compose memory pages. The host-physical memory addresses may refer to the memory that is visible to the hypervisor 116 as available on the system 100.

The host page tables 124 provide entries corresponding to the memory pages that are included in one or more tables.

The host page tables 124 use the entries to map one or more ranges of the host-physical memory addresses into one or more guest-physical address ranges that are assigned to the virtual machine 120 as the guest memory 122. The guest-physical memory refers to the memory that is visible to the guest 128 running in the virtual machine 120. The guest-virtual memory refers to a continuous virtual address space presented by the guest 128 to one or more applications 129. In particular, the guest-virtual memory is the memory that is visible to the one or more applications 129 running inside the virtual machine 120.

The guest memory 122 is structured with guest page tables 126 that provide another layer of memory address mappings. The guest page tables 126 map one or more ranges of guest-virtual memory addresses to the guest-physical addresses provided by the host page tables 124. Accordingly, the guest-virtual memory addresses are mapped to guest-physical memory addresses by the guest page tables 126, and the guest-physical memory addresses are mapped to the host-physical memory addresses by the host page tables 124. Thus, memory pages in the guest memory may include one or more guest-virtual memory addresses that map to host-physical memory addresses by way of the guest page tables 126 and the host page tables 124.

The virtual machine 120 includes at least one guest 128, which may include a kernel, OS, and/or other application 129 running on the virtual machine 120. A guest kernel of the virtual machine 120 may provide core computing functionality, such as allocating memory pages of the guest memory 122 to processes and/or threads, communicating input and/or output (I/O) to and from virtual devices, managing a file system, handling interrupts, scheduling and running processes to execute instructions of computing tasks by a virtual processor, providing an interface between devices and software applications, and/or providing other important computing features. A guest of the virtual machine 120 may run on top of the kernel to provide additional interfaces and functionality on the virtual machine 120 beyond those offered by the kernel. The guest may include, for example, RED HAT ENTERPRISE LINUX, FEDORA, WINDOWS, OS X, IOS, ANDROID, or any other OS. In some examples, the virtual machine 120 may be structured to include a plurality of guests.

The guest 128 (e.g., a guest kernel, guest, and/or other application) running on the virtual machine 120 may access the guest-virtual memory addresses provided by the guest memory 122 to read, write, and/or execute data. The guest page tables 126 and the host page tables 124 translate the guest-virtual memory addresses to host-physical memory addresses using their page table mappings. Accordingly, the guest 128 is provided read, write, and/or execute access to data stored in the memory 114.

B. Free Guest Memory Pages

Memory pages may be classified as dirty pages or free pages based on their current usage or non-usage status. Dirty pages include memory pages that have been allocated to one or more guests of the virtual machine and modified to store data. For example, memory pages may be allocated to store instructions executable by a process running on the virtual machine. In another example, memory pages may be allocated to store other types of data for guests of the virtual machine, such as media files, databases, program files, and/or any other type of data. These memory pages that are allocated and modified for storing data are classified as dirty memory pages.

Free memory pages are memory pages that are not in-use and/or are available for allocation by the virtual machine. Free memory pages may include pages that have not been previously allocated as well as memory pages that have been previously allocated but have since been de-allocated and/or freed. Memory pages may be freed when the data stored on the memory pages is no longer used and the memory pages are therefore no longer active. Accordingly, free memory pages may be inactive memory pages, clean memory pages, and other memory pages that are not currently in use on the virtual machine.

The guest memory 122 is structured with a free bitmap 130 that maintains status indicators corresponding to the memory pages in the guest memory 122. The free bitmap 130 is structured to store a plurality of bits, where each bit has a zero or a one value corresponding to a memory page in guest memory 122. Each bit indicates whether the memory page corresponding to the bit is in-use or free. The guest 128 may update the free bitmap 130 to track an up-to-date status of each memory page. Accordingly, the free bitmap 130 may be updated as memory pages are allocated and modified to indicate that the memory pages are in-use. Similarly, as memory pages are de-allocated the guest 128 may update the free bitmap 130 to indicate that the memory pages are free memory pages that are available for allocation. Although the free bitmap 130 is illustrated as being located in guest memory 122, in other examples the free bitmap 130 may reside outside of the guest memory 122 in any memory region that is accessible by the hypervisor 116.

C. Memory Ballooning

The guest memory 122 is divided into memory pages, which may facilitate the management of the guest memory 122. As shown in FIG. 1, the guest memory 122 includes memory pages 132, 134, 136, and 138, although the guest memory 122 may include fewer or considerably more memory pages. The one or more applications 129 may access memory pages 132 and 134 to store and access data. The memory pages 136 and 138 are not currently being used by any of the one or more applications 129. Although not shown, the memory pages 132, 134, 136, and/or 138 and/or other memory pages in the guest memory 122 may also be part of a virtual memory system that swaps out memory pages to one or more swap files. This may allow the guest 128 to emulate more memory capacity than is currently available in the guest memory 122 and is sometimes referred to as memory overcommit because the guest 128 may provide more guest memory 122 to the one or more applications 129 than is available in actual memory.

The virtual machine 120 further includes a memory balloon 140 being managed by a balloon driver 142. The balloon driver 142 may be loaded into the guest 128 as a pseudo-device driver. The memory balloon 140 may allow the guest 128 to temporarily make available or loan guest memory 122 back to the hypervisor 116 or to the OS that is hosting the guest 128, as will be described in further detail below. Although examples in the disclosure may describe the hypervisor 116 as interacting with the guest 128 and sending an inflate request, receiving an inflate notification, and determining to reclaim or not to reclaim memory, it should also be understood that the host OS may interact similarly with the guest 128 and this description also applies to the host OS.

The hypervisor 116 provides a virtual environment in which the guest 128 may operate. The hypervisor 116 includes, among its many features, a memory manager 146. The memory manager 146 manages the host memory 114 for the hypervisor 116 as well as the memory allocated to virtual machines and guests (e.g., the guest memory 122 provided to the guest 128). The host memory 114 is divided into memory pages that are managed by the memory manager 146. As shown, the host memory 114 includes host memory pages 172, 174, 176, and 178, although the host memory 114 may include fewer or considerably more memory pages. Because the guest memory 122 allocated to the guest 128 comes from the host memory 114, each of the memory pages in the guest 128 is mapped to memory pages in the host memory 114. A guest memory page corresponds to a host memory page if the guest memory page maps to the host memory page, and vice versa.

In the example of FIG. 1, the guest memory page 132 is mapped to the host memory page 174, the guest memory page 134 is mapped to the host memory page 172, the guest memory page 136 is mapped to the host memory page 176, and the guest memory page 138 is mapped to the host memory page 178. Accordingly, if the one or more applications 129 accesses memory pages 132 and/or 134 in the guest memory 122, it is actually accessing the memory pages 174 and/or 172, respectively, in the host memory 114. The memory manager 146 may keep track of how the memory pages are allocated and mapped to prevent one guest and/or application from inappropriately accessing and/or writing to memory pages allocated to another guest and/or application.

Because the memory usage of the hypervisor 116 and/or guest(s) may change over time, the hypervisor 116 may desire to change the amount of memory allocated to one or more guests. Memory ballooning may be an efficient way to borrow memory pages from one guest and make them available for use by the hypervisor 116. The guest 128 is configured to support memory ballooning. The memory manager 146 may send an inflate request to the balloon driver 142 to borrow memory pages from the guest 128. Once the guest 128 receives the inflate request from the memory manager 146, the guest 128 may satisfy the inflate request by placing one or more guest memory pages into the memory balloon 140. In doing so, the guest 128 is releasing these memory pages for use by the hypervisor 116, and the guest 128 further refrains from using those memory pages while they are in the memory balloon 140. The guest 128 may send an inflate notification to the hypervisor 116 notifying it that a set of guest memory pages is unused by the guest 128 at a particular time, which corresponds to the inflate notification. In an example, the inflate notification notifies the hypervisor 116 that the guest 128 has placed a set of guest memory pages in the memory balloon 140. A guest memory page placed in the memory balloon 140 may be referred to as a ballooned memory page. As the memory manager 146 requests more memory pages for the memory balloon 140, the memory balloon 140 inflates.

The amount of memory residing in the memory balloon 140 may change with time because the memory balloon 140 may inflate and deflate over time. At some later point in time, the guest 128 may want to reclaim memory from the memory balloon 140, thus deflating the memory balloon 140. Using one approach, the guest 128 requests memory placed in the memory balloon 140 back from the hypervisor 116 and waits for the hypervisor 116 to respond. This approach, however, may be time consuming because the guest 128 waits for the hypervisor 116's acknowledgement or approval before reclaiming the ballooned memory pages.

This problem may be solved by allowing the guest 128 to asynchronously reclaim the memory from the memory balloon 140 and start using it, without sending a request to the hypervisor 116 and receiving approval from it to do so. A problem exists, however, when the guest 128 starts using the ballooned memory pages before the hypervisor 116 receives the inflate notification. Unbeknownst to the hypervisor 116, the guest 128 has started to use at least some of the guest memory pages that were indicated in the inflate notification as being in the memory balloon 140. Once the hypervisor 116 receives the inflate notification, the hypervisor 116 reclaims the host memory pages corresponding to the guest memory pages specified in the inflate notification, thus discarding the new data stored by the guest 128.

The present disclosure provides techniques for preventing the hypervisor 116 from discarding new data stored by the guest 128. The hypervisor 116 includes a counter module 148 that generates one or more identifiers 152 corresponding to one or more data structures 150. The counter module 148 may create one or more data structures 150 per identifier 152, each identifier corresponding to a point in time or to a particular time period. Although examples may discuss a component (e.g., data structure or identifier) corresponding to a particular time (e.g., Time T1 or Time T2), it should be understood that the component may correspond to a period of time (e.g., 5 minutes). In some examples, the period of time has the particular time as the start time (e.g., Time T1 or Time T2).

The hypervisor 116 also includes a dirty page tracker 154 that tracks modifications to guest memory pages and uses the one or more data structures 150 to indicate when and which guest memory page(s) have been modified. In an example, the dirty page tracker 154 detects a modification to a guest memory page and marks the most recently created data structure with the modification information (e.g., which guest memory page was modified). Because a data structure corresponds to an identifier, which itself corresponds to a particular time, the markings in a particular data structure indicate which guest memory pages were modified during the particular time. As more data structures are created and marked with guest memory page modification information, the hypervisor 116 effectively has a timeline regarding which guest memory pages were modified and when relative to each other. With the use of an identifier included in the inflate request and matching inflate notification, the guest may remove memory pages from the memory balloon and start modifying them, without informing the hypervisor of such use. Accordingly, it may be unnecessary for the guest to hold a lock on these memory pages.

III. HYPERVISOR SENDS AN INFLATE REQUEST INCLUDING AN IDENTIFIER TO GUEST

Figure 2:
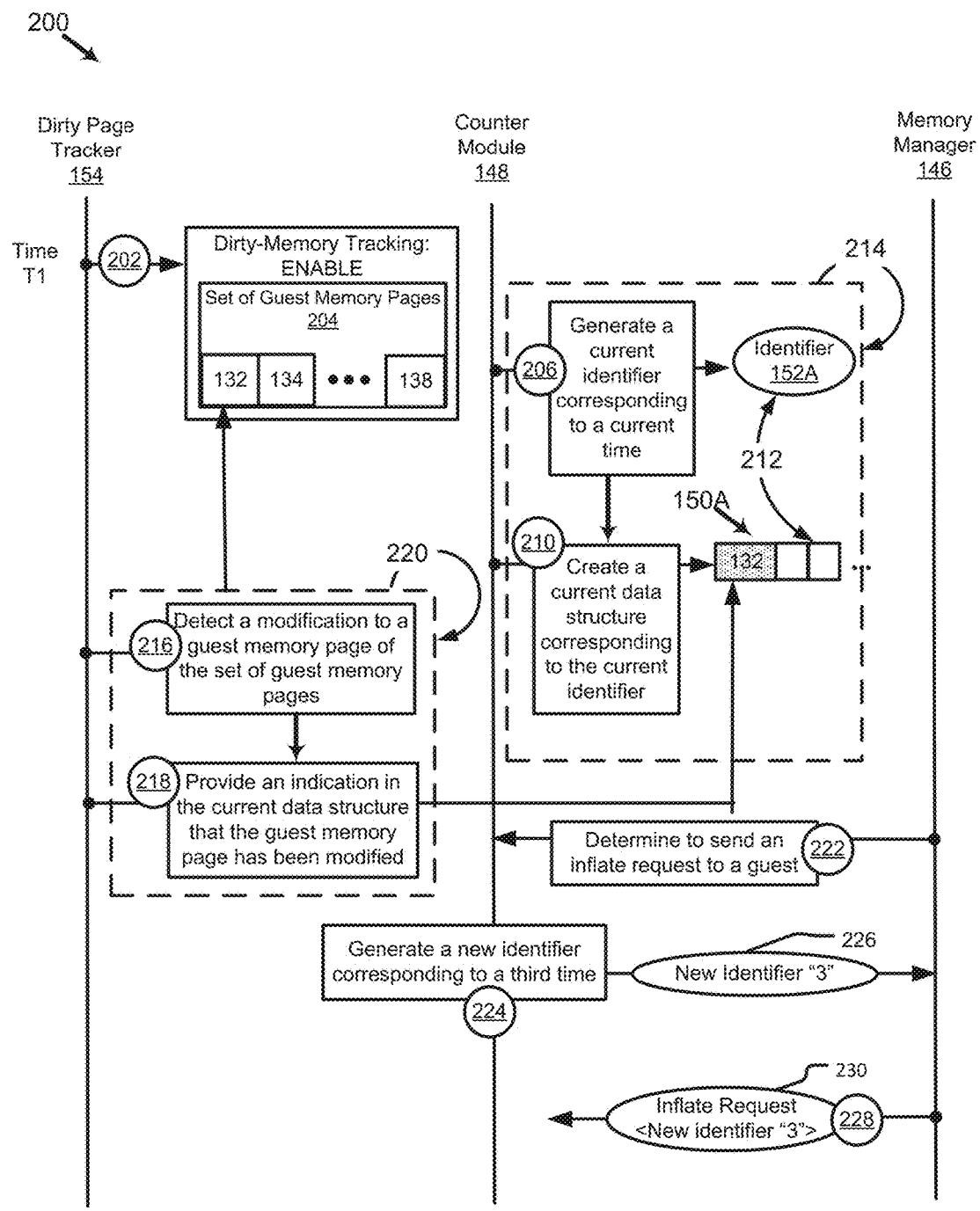
FIG. 2 is an example process flow for sending an inflate request to a guest in accordance with one or more examples.

FIG. 2 is an example process flow 200 for sending an inflate request to the guest 128 in accordance with one or more examples.

A. Dirty Memory Tracking

At action 202, at Time T1, the dirty page tracker 154 enables dirty-memory tracking for a set of guest memory pages 204 including guest memory pages 132, 134, . . . , and 138. The dirty page tracker 154 tracks the set of guest memory pages 204 and detects writes to them. The set of guest memory pages 204 is part of the guest memory 122 allocated to the guest 128 by the hypervisor 116. The dirty page tracker 154 detects a dirty memory page indicator that identifies one or more dirty memory pages. In the present example, the dirty memory page indicator is detected by the dirty page tracker 154 to identify one or more tracked memory pages that have been modified by the guest 128 or another entity (e.g., application 129). These identified one or more dirty pages may include, for example, memory pages previously identified as free memory pages (e.g., in an inflate notification), but that have since been modified.

The guest 128 may send dirty memory page indicators to the dirty page tracker 154. In some examples, the dirty memory page indicator may include any communication from the guest 128 to the dirty page tracker 154 that identifies one or more dirty memory pages. For example, the communication may be sent via shared memory, interrupts, hypercalls, and/or other signaling mechanisms. For example, the guest 128 may asynchronously provide dirty memory page indicators to the dirty page tracker 154 during the memory ballooning, without delaying the guest 128's use of these memory pages. Accordingly, the dirty page tracker 154 may detect dirty page indicators by receiving them from the guest 128.

In some examples, the dirty page tracker 154 identifies dirty memory pages by detecting dirty memory page indicators in other ways. For example, enabling the dirty-memory tracking may include write-protecting the set of guest memory pages 204. As such, the modification of a guest memory page of the set of guest memory pages 204 may cause a page fault to occur, which may trigger a processor to generate an exception that provides the dirty page tracker 154 with the identities of the one or more memory pages whose attempted modification triggered the page fault. Accordingly, the dirty page tracker 154 may detect dirty memory page indicators in this way to identify these memory pages as dirty pages and allow the attempted modification to be performed. In some examples, the modification is performed by changing the permissions of the memory pages to allow the guest to perform the modification or by performing the modification by the hypervisor 116 on behalf of the guest 128. In some examples, a flag is set in the host page tables 124 or the guest page tables 126. In response to modification of a guest memory page corresponding to the flag, the flag may be cleared as a dirty memory page indicator.

B. Inflate Request Includes an Identifier Corresponding to a Time

At action 206, the counter module 148 generates a current identifier 152A corresponding to a current time. At action 210, the counter module 148 creates a current data structure 150A corresponding to the current identifier 152A. An identifier is the current identifier if it is the most recently generated identifier. A data structure is the current data structure if it is the most recently created data structure. An arrow 212 associated with the identifier 152A and the data structure 150A is used to indicate that the data structure 150A corresponds to the current identifier 152A. The counter module 148 may generate additional identifiers and/or data structures periodically (e.g., after a threshold period of time elapses). A box represented with dashed lines includes actions 206 and 210, and an arrow 214 associated with this box indicates that each of action 206 and/or action 210 may be repeated as the counter module 148 generates additional identifiers corresponding to a particular time and/or data structures corresponding to an identifier.

Time T1 may correspond to a first time, and the current time may correspond to a second time (Time T2) that succeeds Time T1. In an example, the identifier is a counter, and the counter module 148 generates a new identifier by incrementing the value of the previous identifier by one. For example, a first identifier may be "1" and correspond to a first data structure, a second identifier may be "2" and correspond to a second data structure, a third identifier may be "3" and correspond to a third data structure, etc., and each of these identifiers corresponds to a particular time (e.g., Time T1, Time T2, Time T3, etc.).

At action 216, the dirty page tracker 154 detects a modification to a guest memory page 132 of the set of guest memory pages 204. A guest memory page may be modified by the guest 128 or another entity (e.g., application 129). At action 218, responsive to the detection, the dirty page tracker 154 provides an indication in the current data structure that the guest memory page 132 has been modified. In an example, the dirty page tracker 154 marks the guest memory page 132 as modified in the current data structure 150A.

In some examples, the data structure is an array, and elements in the array reference the modified guest memory page by storing the guest memory address of the modified guest memory page or by storing a pointer to the guest memory page. If data structure 150A is the current data structure, the dirty page tracker 154 may mark in an element of the array that the guest memory page 132 has been modified. A box represented with dashed lines includes actions 216 and 218, and an arrow 220 associated with this box indicates that each of action 216 and/or action 218 may be repeated as the dirty page tracker 154 detects modifications to the tracked guest memory pages and provides these indications in the current data structure(s). The data structure that is current may change over time.

At action 222, the memory manager 146 determines to send an inflate request. In an example, the memory manager 146 notifies the counter module 148 of the intention to send the inflate request. In response to the memory manager 146's notification, at action 224, the counter module 148 generates a new identifier 226 "3" corresponding to a third time (e.g., Time T3) and provides the memory manager 146 with the new identifier 226. At action 228, the memory manager 146 sends an inflate request 230 including the new identifier 226. In an example, the memory manager 146 sends the inflate request 230 to the guest 128. In some examples, the memory manager 146 specifies one or more guest memory pages in the inflate request 230 for the guest 128 to place in the memory balloon 140.

Figure 3:
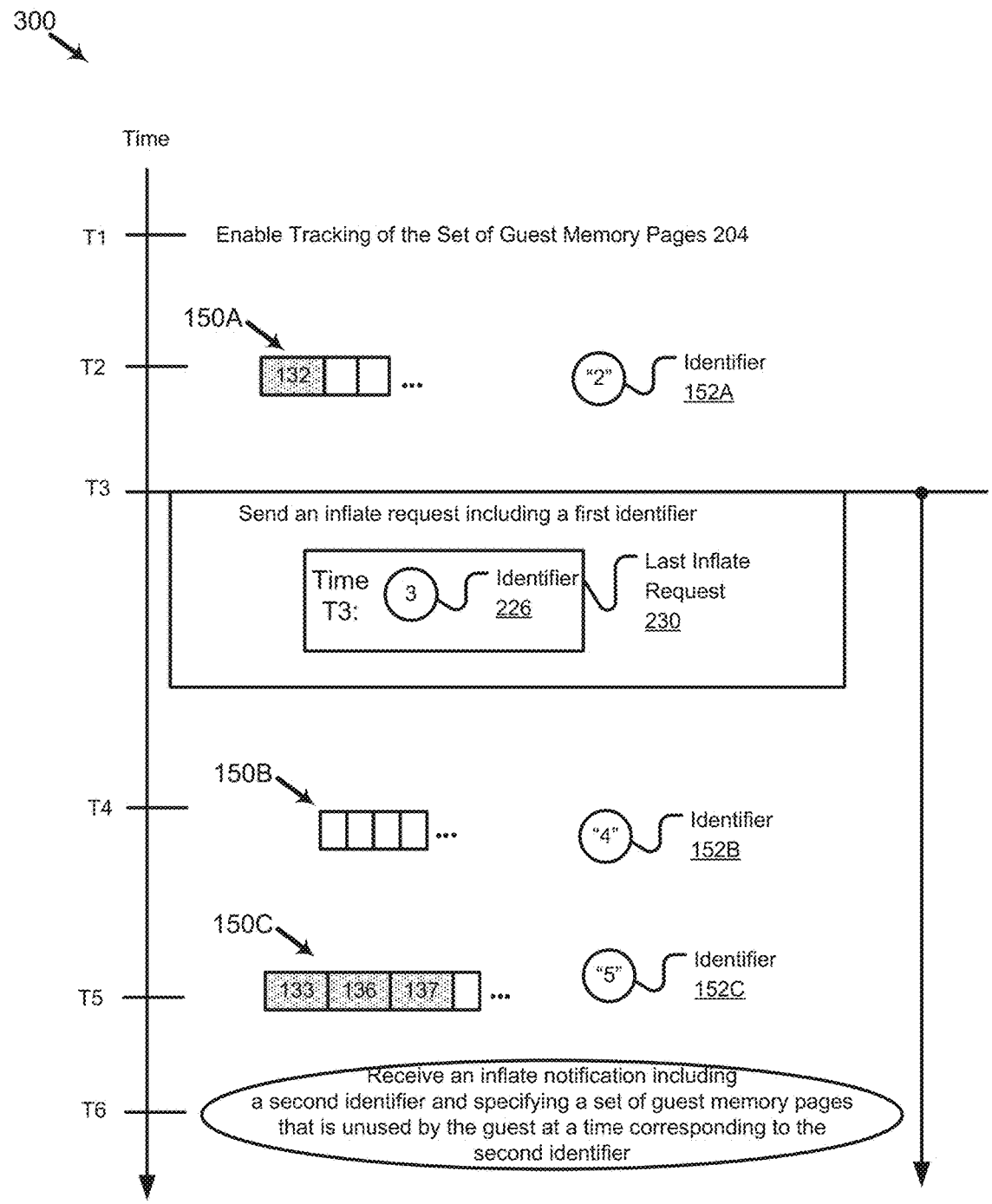
FIG. 3 is an example diagram showing a timeline with specified events in accordance with one or more examples.

FIG. 3 is an example diagram 300 showing a timeline with specified events in accordance with one or more examples. In FIG. 3, Time T1 precedes Time T2, which precedes Time T3, which precedes Time T4, etc. At Time T1, the dirty page tracker 154 enables tracking of the set of guest memory pages 204. At Time T2, the counter module 148 generates the identifier 152A "2" and the data structure 150A, both corresponding to the Time T2. Additionally, while the data structure 150A was the current data structure, the dirty page tracker 154 detected modification(s) to the guest memory page 132 and marked the data structure 150A accordingly, as indicated by the dark marking in the first element in the data structure 150A.

At Time T3, the counter module 148 generates the identifier 226 "3" corresponding to Time T3 and sends the inflate request 230 including the identifier 226 "3" to the guest 128. The counter module 148 may save the inflate request 230, identifier 226, and the Time T3 into hypervisor memory 117 for comparison(s) to inflate notification(s) later received from the guest 128. An inflate request and an inflate notification including the same identifier may be a matched pair. In this example, the guest sends the inflate notification in response to the inflate request.

At Time T4, the counter module 148 generates an identifier 152B "4" and a data structure 150B corresponding to the Time T4 and the identifier 152B "4." Additionally, while the data structure 150B was the current data structure, the dirty page tracker 154 did not detect any modifications to the set of guest memory pages 204, as indicated by no markings in the data structure 150B.

At Time T5, the counter module 148 generates an identifier 152C "5" and a data structure 150C corresponding to the Time T5 and the identifier 152C "5." Additionally, while the data structure 150C was the current data structure, the dirty page tracker 154 detected modification(s) to the guest memory pages 133, 136, and 137, and marked the data structure 150C accordingly, as indicated by the dark markings in the data structure 150C.

At Time T6, the memory manager 146 receives an inflate notification from the guest 128, the inflate notification including a second identifier and specifying a set of guest memory pages that is used by the guest 128 at a time corresponding to the second identifier. In an example, the guest 128 has placed the set of guest memory pages in the memory balloon 140. If the second identifier precedes the first identifier, then the inflate notification is in response to an inflate request that was sent previous to the inflate request corresponding to Time T3. A first identifier corresponding to a first time precedes a second identifier corresponding to a second time if the first time precedes the second time. Accordingly, this inflate notification may be stale and the memory manager 146 may accordingly discard the inflate notification. The memory manager 146 discards an inflate notification by determining to not reclaim a set of host memory pages corresponding to the set of guest memory pages specified in the inflate notification. Accordingly, the memory manager 146 does not reclaim the set of host memory pages corresponding to the set of guest memory pages specified in the inflate notification.

If the second identifier matches the first identifier, then the inflate notification is in response to the inflate request. Accordingly, the inflate request and inflate notification may be referred as "matching." In this example, the memory manager 146 may determine which guest memory pages specified in the inflate notification have been modified since Time T3, the time corresponding to the identifier included in the inflate notification. If a guest memory page has been modified since Time T3, the guest 128 has removed the guest memory page from the memory balloon 140 and has already started using it. Accordingly, it is undesirable to reclaim the host memory page corresponding to this dirty guest memory page. In contrast, if a guest memory page has not been modified since Time T3, the hypervisor 116 may discard content stored at this guest memory page and reclaim the host memory page corresponding to the guest memory page for use. The hypervisor 116 may use this reclaimed host memory page or allow another entity to use it (e.g., another virtual machine running on the host machine 102).

IV. RECLAIM THE APPROPRIATE BALLOONED GUEST MEMORY PAGES

Figure 4:
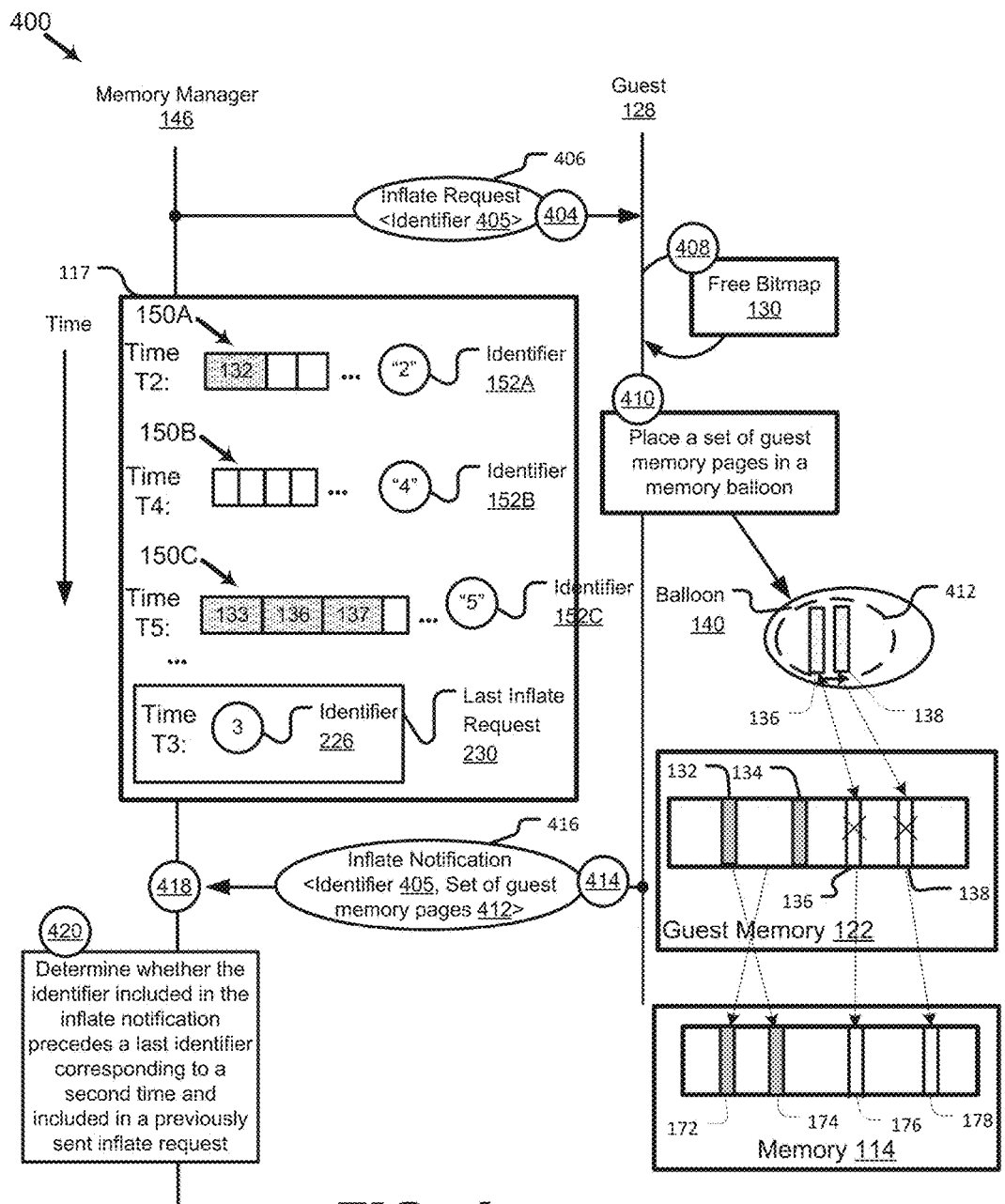
FIG. 4 is an example process flow for determining whether to reclaim host memory pages corresponding to guest memory pages specified in an inflate notification in accordance with one or more examples.

FIG. 4 is an example process flow 400 for determining whether to reclaim host memory pages corresponding to guest memory pages specified in an inflate notification in accordance with one or more examples.

A. Place a Set of Free Guest Memory Pages in a Memory Balloon

At action 404, the guest 128 receives an inflate request 406 including an identifier 405 from the memory manager 146. The identifier 405 corresponds to a time $T_N$ and to a data structure. In response to the inflate request 406, at action 408, the guest 128 searches the free bitmap 130 to determine a set of free guest memory pages. At action 410, the guest 128 satisfies the inflate request 406 by placing a set of guest memory pages 412 into the memory balloon 140. In doing so, the guest 128 releases these memory pages for use by the hypervisor 116, and the guest 128 further refrains from using those memory pages while they are in the memory balloon 140.

The set of guest memory pages 412 includes guest memory pages 136 and 138. In the present disclosure, placing the set of guest memory pages 412 in the memory balloon 140 may also refer to placing a set of guest memory addresses at which the set of guest memory pages 412 resides into the memory balloon 140. The memory balloon 140 includes the ballooned memory pages 136 and 138, which correspond to the host memory pages 176 and 178 in the host memory 114. Because the memory pages 136 and 138 are placed in the memory balloon 140, the guest 128 has designated the memory pages 136 and 138 as unavailable and will not allow the one or more applications 129 and/or other processes of the guest 128 to use the memory pages 136 and 138 until they are removed from the memory balloon 140. In an example, a memory page may be removed from the memory balloon if it is unpinned. In some examples, the guest 128 maintains a list of ballooned memory pages in the memory balloon 140, and adds to this list as more memory pages are placed in the memory balloon 140. The guest 128 may remove a memory page from the memory balloon 140 by removing this memory page from the list of ballooned memory pages. As a further result of ballooning the memory pages 136 and 138, the corresponding memory pages 176 and 178 in the host memory 114 are made available as needed by the hypervisor 116 or host OS. Accordingly, the hypervisor 116 may reclaim host memory pages 176 and 178 and reallocate them to another entity (e.g., the hypervisor 116 or another virtual machine running on the host machine 102).

B. Inflate Notification Includes an Identifier and Specifies a Set of Guest Memory Pages At action 414, the guest 128 sends an inflate notification 416, which includes the identifier 405 included in the inflate request 406 and indicates that the guest 128 has placed the set of guest memory pages 412 in the memory balloon 140. At action 418, the memory manager 146 receives the inflate notification 416. During the time between actions 414 and 418, the guest 128 may remove from and modify at least one of the guest memory pages from the memory balloon 140. As will be explain further, to prevent the hypervisor 116 from discarding these dirty guest memory pages, the dirty page tracker 154 tracks these modifications and ties them to a time during which they occurred.

1. Match the Inflate Notification to an Inflate Request

At action 420, the memory manager 146 determines whether the identifier 405 included in the inflate notification 416 precedes a last identifier corresponding to a last time and included in a previously sent inflate request. The previously sent inflate request may be the last inflate request 230 that was sent to the guest 128 (the most recently sent inflate request to the guest 128) and corresponds to Time T3 and the identifier 226 (included in the inflate request 230 in FIG. 2). In this example, the identifier 226 may also be referred to as the last identifier, which is the identifier included in the last inflate request.

If the identifier 405 included in the inflate notification 416 precedes the last identifier 226, the inflate notification 416 may be considered stale because it was sent in response to an old inflate request sent prior to the last inflate request 230. In this example, a delay may have occurred. Accordingly, if the identifier 405 precedes the last identifier 226, the memory manager 146 may discard the inflate notification 416. The memory manager 146 may discard the inflate notification 416 by determining to not reclaim host memory pages corresponding to the guest memory pages specified in the inflate notification. The hypervisor 116 may wait for another inflate notification before reclaiming host memory. In contrast, if the identifier 405 does not precede the last identifier 226, then the identifier 405 matches the last identifier 226 and they correspond to the same time (e.g., Time T3). A first identifier matches a second identifier if they have the same value. If the identifiers included in both the last inflate request 230 and the inflate notification 416 match, the inflate notification 416 is in response to the last inflate request 230.

2. Do not Reclaim Host Memory Pages Corresponding to Dirty Guest Memory Pages

The memory manager 146 performs actions based on whether the identifier 405 included in the inflate notification 416 precedes the last identifier 226. The set of ballooned guest memory pages 412 includes a first subset of guest memory pages modified since the time corresponding to the identifier 405 and a second subset of guest memory pages that have not been modified since the time corresponding to the identifier 405, where the identifier included in the inflate request matches the identifier included in the inflate notification. The memory manager 146 determines to which subset a guest memory page belongs by consulting the data structures corresponding to identifiers that match or succeed the identifier included in the inflate notification 416. Referring back to FIG. 3, the memory manager 146 may analyze the data structures 152B and 152C, which correspond to Time 4 and Time 5.

The memory manager 146 is able to determine whether those guest memory pages that are tracked have been modified since Time T3 and after Time T3. In an example, the memory manager 146 determines that the first identifier does not precede the last identifier 226. In this example, for each data structure corresponding to a time that does not precede the first time, the memory manager 146 determines whether one or more guest memory pages of the set of guest memory pages 412 is indicated as modified in the one or more data structures corresponding to a time that does not precede a time correspond to the first identifier. A first subset of the set of guest memory pages modified since the first time includes the one or more guest memory pages indicated as modified in the respective data structure. A second subset of the set of guest memory pages not modified since the first time is mutually exclusive of the first subset. In an example, the second subset includes the remaining guest memory pages of the set of guest memory pages specified in the inflate notification, after removing the first subset.

If the identifier 405 does not precede the last identifier 226, for a first subset of the set of guest memory pages 412 modified since Time T3, the memory manager 146 determines to not reclaim a first set of host memory pages corresponding to the first subset of guest memory pages. In this example, the memory manager 146 analyzes data structure 150B and determines that no guest memory pages were modified at Time T4, and also analyzes data structure 150C and determines that a ballooned guest memory page 136 was modified at Time T5. Accordingly, in this example, the first subset includes the guest memory page 136, and thus the memory manager 146 does not reclaim host memory page 176.

If the identifier 405 does not precede the last identifier 226, for a second subset of the set of guest memory pages 412 not modified since Time T3, the memory manager 146 reclaims a second set of host memory pages corresponding to the second subset of guest memory pages. In this example, the memory manager 146 analyzes data structures 150B and 150C and determines that ballooned guest memory page 138 has not been modified since Time T3. Accordingly, in this example, the second subset includes the guest memory page 138, and thus the memory manager 146 reclaims the host memory page 178. The hypervisor 116 may begin to use the reclaimed host memory pages corresponding to the second subset of guest memory pages for its own processes and/or make them available for use by other guests. At a later time, when the reclaimed host memory pages are no longer needed and are not being used, the hypervisor 116 may release the memory pages making them again available for use by the guest 128 and its one or more applications 129. The hypervisor 116 may send a deflate notification to the guest 128 to remove one or more guest memory pages from the memory balloon 140. Additionally, the guest 128 may deflate the memory balloon 140 by using the memory pages placed in the memory balloon 140.

After determining to not reclaim the first set of host memory pages corresponding to the first subset of guest memory pages and to reclaim the second set of host memory pages corresponding to the second subset of guest memory pages, the dirty page tracker 154 may disable the dirty memory tracking.

V. EXAMPLE METHODS

Figure 5:
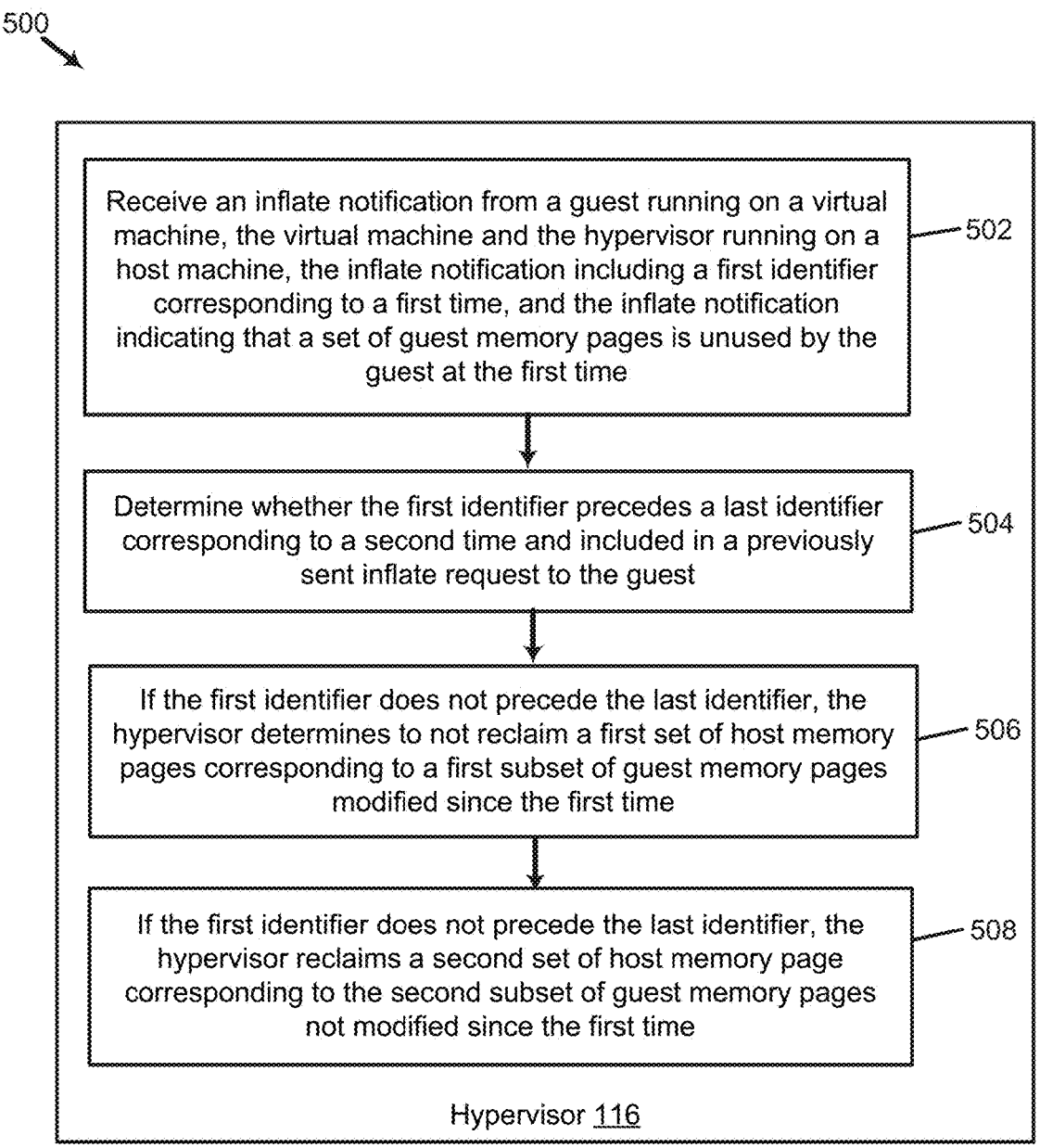
FIG. 5 is a flowchart illustrating a method of managing memory in accordance with one or more examples.

FIG. 5 is a flowchart illustrating a method 500 of managing memory in accordance with one or more examples. Method 500 is not meant to be limiting and may be used in other applications.

Method 500 includes actions 502-508. At action 502, the hypervisor 116 receives an inflate notification from a guest running on a virtual machine, the virtual machine and the hypervisor running on a host machine, the inflate notification including a first identifier corresponding to a first time, and the inflate notification indicating that a set of guest memory pages is used by the guest at the first time.

At action 504, the hypervisor 116 determines whether the first identifier precedes a last identifier corresponding to a second time and included in a previously sent inflate request to the guest. At action 506, if the first identifier does not precede the last identifier, the hypervisor 116 determines to not reclaim a first set of host memory pages corresponding to a first subset of guest memory pages modified since the first time. At action 508, if the first identifier does not precede the last identifier, the hypervisor 116 reclaims a second set of host memory pages corresponding to a second subset of guest memory pages not modified since the first time.

It is also understood that additional processes may be performed before, during, or after actions 502-508 discussed above. It is also understood that one or more of the actions of method 500 described herein may be omitted, combined, or performed in a different sequence as desired. In an example, action 508 may be performed before action 506.

Figure 6:
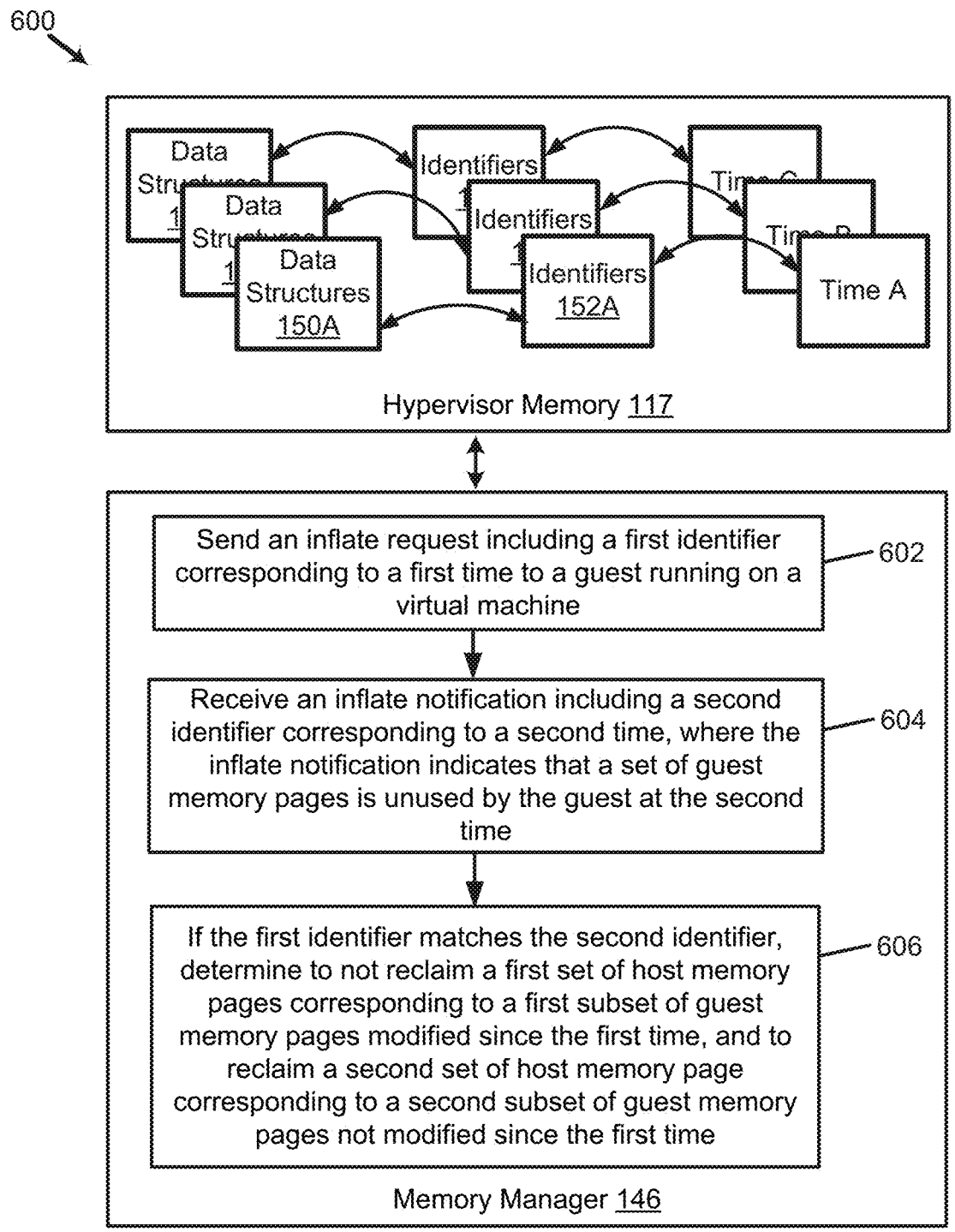
FIG. 6 is a flowchart illustrating a method of managing memory in accordance with one or more examples.

FIG. 6 is a flowchart illustrating a method 600 of managing memory in accordance with one or more examples. Method 600 is not meant to be limiting and may be used in other applications. In FIG. 6, the hypervisor memory 117 stores one or more identifiers 152 and one or more data structures 150, each data structure corresponding to an identifier that corresponds to a time. The memory manager 146 may store data in, modify data stored in, and/or retrieve data from the hypervisor memory 117.

Method 600 includes actions 602-606. At action 602, the memory manager 146 sends an inflate request including a first identifier corresponding to a first time to a guest running on a virtual machine. At action 604, the memory manager 146 receives an inflate notification including a second identifier corresponding to a second time. The inflate notification indicates that a set of guest memory pages is unused by the guest at the second time. At action 606, if the first identifier matches the second identifier, the memory manager 146 determines to not reclaim a first set of host memory pages corresponding to a first subset of guest memory pages modified since the first time, and reclaims a second set of host memory pages corresponding to a second subset of guest memory pages not modified since the first time.

It is also understood that additional processes may be performed before, during, or after actions 602-606 discussed above. It is also understood that one or more of the actions of method 600 described herein may be omitted, combined, or performed in a different sequence as desired.

As discussed above and further emphasized here, FIGS. 1-6 are merely examples, which should not unduly limit the scope of the claims. One of ordinary skill in the art would recognize many variations, alternatives, and modifications.

In the foregoing description, numerous details are set forth. It will be apparent, however, to one of ordinary skill in the art having the benefit of this disclosure, that the present disclosure may be practiced without these specific details. In some instances, wellknown structures and devices are shown in block diagram form, rather than in detail, in order to avoid obscuring the present disclosure. Although illustrative examples have been shown and described, a wide range of modification, change and substitution is contemplated in the foregoing disclosure and in some instances, some features of the examples may be employed without a corresponding use of other features. In some instances, actions may be performed according to alternative orderings. One of ordinary skill in the art would recognize many variations, alternatives, and modifications. Thus, the scope of the invention should be limited only by the following claims, and it is appropriate that the claims be construed broadly and in a manner consistent with the scope of the examples disclosed herein.

What is claimed is:

1. A method of managing memory, comprising:
   receiving, by a hypervisor, an inflate notification from a guest running on a virtual machine, the virtual machine and the hypervisor running on a host machine, the inflate notification including a first identifier corresponding to a first time, and the inflate notification indicating that a set of guest memory pages is unused by the guest at the first time;
   determining whether the first identifier precedes a last identifier corresponding to a second time and included in a previously sent inflate request to the guest;
   if the first identifier does not precede the last identifier:
      for a first subset of the set of guest memory pages modified since the first time, determining, by the hypervisor, to not reclaim a first set of host memory pages corresponding to the first subset of guest memory pages, and
      for a second subset of the set of guest memory pages not modified since the first time, reclaiming, by the hypervisor, a second set of host memory pages corresponding to the second subset of guest memory pages; and
   if the first identifier precedes the last identifier, discarding the inflate notification, wherein discarding the inflate notification includes determining to not reclaim a set of host memory pages corresponding to the set of guest memory pages specified in the inflate notification.

2. The method of claim 1, wherein if the first identifier does not precede the last identifier, the first identifier matches the last identifier.

3. The method of claim 1, further comprising:
   tracking, by the hypervisor, a third set of guest memory pages allocated to the guest, the third set including the first and second subsets of guest memory pages, and wherein the tracking is initiated at a third time preceding the second time and includes detecting one or more modifications to the third set of guest memory pages allocated to the guest.

4. The method of claim 3, further comprising:
   for one or more periods of time:
      generating an identifier corresponding to the respective time; and
      creating a data structure corresponding to the respective identifier and the respective time; and
      if one or more modifications to one or more guest memory pages of the third set of guest memory pages has been detected, providing an indication of the one or more modifications in the respective data structure.

5. The method of claim 4, further comprising:
   generating the last identifier; and
   sending, by the hypervisor, an inflate request including the last identifier to the guest, the inflate request being the most recent inflate request sent to the guest.

6. The method of claim 4, further comprising:
   determining that the first identifier does not precede the last identifier; and
   for each data structure corresponding to a time that does not precede the first time, determining whether one or more guest memory pages of the set of guest memory pages is indicated as modified in the respective data structure,
   wherein the first subset includes the one or more guest memory pages indicated as modified in the respective data structure, and the second subset is mutually exclusive of the first subset.

7. The method of claim 4, wherein the data structure is an array.

8. The method of claim 4, further comprising:
   determining that the first identifier does not precede the last identifier; and
   after determining to not reclaim the first set of host memory pages and reclaiming the second set of host memory pages, removing each data structure corresponding to an identifier that precedes the first identifier.

9. The method of claim 3, further comprising:
   after determining to not reclaim the first set of host memory pages and reclaiming the second set of host memory pages, disabling the tracking of the third set of guest memory pages.

10. The method of claim 1, wherein the inflate notification indicates that the guest has placed the set of guest memory pages in a memory balloon.

11. A system for managing memory, comprising:
   a hypervisor memory that stores one or more identifiers and one or more data structures, each data structure corresponding to an identifier that corresponds to a time; and
   a memory manager that sends an inflate request including a first identifier corresponding to a first time to a guest running on a virtual machine and receives an inflate notification including a second identifier corresponding to a second time, wherein the inflate notification indicates that a set of guest memory pages is unused by the guest at the second time, wherein if the first identifier matches the second identifier, the memory manager determines to not reclaim a first set of host memory pages corresponding to a first subset of guest memory pages modified since the first time and reclaims a second set of host memory pages corresponding to a second subset of guest memory pages not modified since the first time, and wherein if the first identifier does not match the second identifier, the memory manager discards the inflate notification.

12. The system of claim 11, wherein the guest receives the inflate request including the first identifier and identifies the set of free guest memory pages.

13. The system of claim 11, wherein the memory manager determines that the first identifier matches the second identifier.

14. The system of claim 11, further comprising:
a dirty page tracker that tracks modifications to a third set of guest memory pages allocated to the guest, wherein the third set includes the first and second subsets of guest memory pages.

15. The system of claim 14, further comprising:
a counter module that for one or more periods of time, generates an identifier corresponding to the respective time and creates a data structure corresponding to the respective identifier and the respective time, wherein for one or more periods of time, the dirty page tracker provides an indication of the one or more modifications in the respective data structure if one or more modifications to one or more guest memory pages of the third set of guest memory pages has been detected.

16. The system of claim 15, wherein for each data structure corresponding to a time that does not precede the first time, the memory manager identifies one or more guest memory pages of the set of guest memory pages indicated as modified in the respective data structure, wherein the first subset includes the one or more identified guest memory pages, and the second subset is mutually exclusive of the first subset.

17. The system of claim 15, wherein the data structure is an array.

18. The system of claim 11, wherein the hypervisor reclaims the second set of host memory pages and provides one or more host memory pages of the second set of host memory pages to one or more entities, wherein an entity is at least one of a host operating system of the host machine, a second virtual machine running on the host machine, or the hypervisor.

19. A machine-readable medium comprising a plurality of machine-readable instructions that when executed by one or more processors is adapted to cause the one or more processors to perform a method comprising:

receiving, by a hypervisor, an inflate notification from a guest running on a virtual machine, the virtual machine and the hypervisor running on a host machine, the inflate notification including a first identifier corresponding to a first time, and the inflate notification indicating that a set of guest memory pages is unused by the guest at the first time;

determining that the first identifier matches a second identifier corresponding to a second time and included in a most recently sent inflate request to the guest;

for a first subset of the set of guest memory pages modified since the first time, determining, by the hypervisor, to not reclaim a first set of host memory pages corresponding to the first subset of guest memory pages; and for a second subset of the set of guest memory pages not modified since the first time, reclaiming, by the hypervisor, a second set of host memory pages corresponding to a second subset of guest memory pages.

* * * * *